(12) United States Patent
Asthana et al.

(10) Patent No.: US 10,699,360 B2
(45) Date of Patent: Jun. 30, 2020

(54) PROCESSING A MACHINE-READABLE LINK

(71) Applicant: Hewlett-Packard Development Company, L.P., Houston, TX (US)

(72) Inventors: Prashant Asthana, Bangalore (IN); Rajesh Bhatia, Bangalore (IN); Amrendra Kumar, Bangalore (IN)

(73) Assignee: Hewlett-Packard Development Company, L.P., Spring, TX (US)

(*) Notice: Subject to any disclaimer, the term of this patent is extended or adjusted under 35 U.S.C. 154(b) by 65 days.

(21) Appl. No.: 15/747,737

(22) PCT Filed: Oct. 28, 2015

(86) PCT No.: PCT/IN2015/050151
§ 371 (c)(1),
(2) Date: Jan. 25, 2018

(87) PCT Pub. No.: WO2017/072779
PCT Pub. Date: May 4, 2017

(65) Prior Publication Data
US 2018/0225801 A1 Aug. 9, 2018

(51) Int. Cl.
*G06T 1/00* (2006.01)
*G06K 7/10* (2006.01)
*G06T 7/73* (2017.01)
*G06T 7/33* (2017.01)
*G06T 7/90* (2017.01)
(Continued)

(52) U.S. Cl.
CPC .............. *G06T 1/0092* (2013.01); *G06K 7/10* (2013.01); *G06K 7/1417* (2013.01); *G06K 9/00744* (2013.01); *G06T 7/337* (2017.01); *G06T 7/74* (2017.01); *G06T 7/90* (2017.01);
(Continued)

(58) Field of Classification Search
CPC ......... G06T 1/0092; G06T 7/74; G06T 7/337; G06T 7/90; G06T 2201/0065; G06T 2207/10016; G06K 7/10; G06K 7/1417; G06K 9/00744; G06Q 10/00
See application file for complete search history.

(56) References Cited

U.S. PATENT DOCUMENTS 5,268,564 A 12/1993 Metlitsky et al.
2004/0250080 A1 12/2004 Levy et al.
(Continued)

FOREIGN PATENT DOCUMENTS

CN 102711057 A 10/2012
CN 103020177 A 4/2013
(Continued)

OTHER PUBLICATIONS

International Search Authority, "International Search Report and the Written opinion, PCT Application No. PCT/IN2015/050151", dated Jul. 25, 2016, 12 pages.
(Continued)

*Primary Examiner* — Carol Wang
(74) *Attorney, Agent, or Firm* — HP Inc. Patent Department (57) ABSTRACT

Approaches for processing a machine-readable link are described. The machine-readable link is readable by a computing system to obtain access to digital content using a communication network.

10 Claims, 7 Drawing Sheets

(51) Int. Cl.
*G06K 7/14* (2006.01)
*G06K 9/00* (2006.01)
*G06Q 10/00* (2012.01)

(52) U.S. Cl.
CPC ...... *G06Q 10/00* (2013.01); *G06T 2201/0065* (2013.01); *G06T 2207/10016* (2013.01)

(56) References Cited

U.S. PATENT DOCUMENTS

| | | |
|---|---|---|
| 2007/0239756 A1 | 10/2007 | Li et al. |
| 2008/0121713 A1 | 5/2008 | Steele et al. |
| 2010/0163624 A1* | 7/2010 | Hosoi ................ G06K 7/10851 235/462.3 |
| 2014/0186026 A1* | 7/2014 | Oshima ................ H04B 10/516 398/25 |
| 2017/0163899 A1* | 6/2017 | Irie ........................ G03B 15/00 |

FOREIGN PATENT DOCUMENTS

| | | |
|---|---|---|
| CN | 103207982 A | 7/2013 |
| CN | 103593695 A | 2/2014 |
| CN | 104778440 A | 7/2015 |
| WO | WO-2008143612 | 11/2008 |

OTHER PUBLICATIONS

Zebra Technologies, "Barcode Profile Feature Reference", May 15, 2014, 15 pages. https://developer.motorolasolutions.com/docs/DOC-2182.

\* cited by examiner

PROCESSING A MACHINE-READABLE LINK

CLAIM FOR PRIORITY

The present application is a national stage filing under 35 U.S.C. § 371 of PCT application number PCT/IN2015/050151, having an international filing date of Oct. 28, 2015, the disclosure of which is hereby incorporated by reference in its entirety.

BACKGROUND

Printed content, either textual or image-based, as a printed document may be provided with machine-readable links which may be read optically using an image capture device, coupled to a computing system. Each of such machine-readable links may be encoded or associated with various types of information (also referred to as payload). Such information in turn may supplement or complement the content of the printed document. Examples of such links include one- or two-dimensional barcodes, digital watermarks, image fingerprints, image watermarks, and the like. Interaction with such machine-readable links allows any user to access information encoded within the respective machine-readable links.

BRIEF DESCRIPTION OF THE DRAWINGS

The following detailed description references the drawings, wherein.

DETAILED DESCRIPTION

Printed medium has so far been one mechanism for distribution of content. The printed content may be made available as a document or in any printed form by which textual or image-based content may be distributed. However, the extent and the amount of information that may be conveyed are limited by the area of the document on which content is printed. In some cases, the printed content may further include one or more machine-readable links. Such machine-readable links, when optically read by a computing system, may be decoded by the computing system and allow access to additional information via a communication network. The decoding of the machine-readable link may also be carried out by a central linking service implemented remotely from the computing system.

Generally, in order to access the additional information linked with the machine-readable links, a computing system with an image capturing device is brought in proximity to the machine-readable link and an image of the machine-readable link is captured. The computing systems include any processor-based systems capable of implementing one or more functions based on stored programmable instructions executable by a processor. Examples of such computing systems include, but are not limited to, smartphones, tablets, or any other types of handheld computing systems.

Returning to the operation of computing systems, a user intending to scan or read the machine-readable link may initiate or activate one or more applications (installed on the computing system) for interacting with the machine-readable link and obtaining information associated therein. However, for the time duration that such applications are activated to the instant when an image of the machine-readable link is captured, the application remains in an active state. In addition, various other functionalities of the computing system, such as the camera function, may also be in an active state. Such functions when active, while not in use, may unnecessarily use the stored battery power and also impose an overhead on the processing resources of the computing system.

Furthermore, in order to decode the machine-readable link, the applications may also activate a plurality of coding-decoding engines (codec) for decoding and resolving the machine-readable link. Generally, all such codecs execute simultaneously till a correct codec corresponding to the machine-readable link processes it and returns an outcome. Consequently, the processing resources required may be high for executing all the available codecs. Additionally, in cases where the machine-readable link is to be decoded, i.e., resolved by a linking service implemented remotely, the computing system may transmit captured images to the linking services for processing and obtaining the associated information. In such cases, the computing system may capture multiple images of the machine-readable link, of which many may be similar. As a result, transmitting similar images may utilize additional bandwidth and data.

Approaches for processing a machine-readable link are described. The present approaches may be implemented using a computing system coupled to an image capturing device. The image capturing device may be coupled to the computing system through a wired or wireless mechanism, or may be integrated within the computing system. In operation, a user of the computing system may activate one or more link detection processes for scanning a machine-readable link under consideration. The activation of such processes may be carried out through the execution of one or more applications installed on the computing system.

The computing system held by a user, may be in motion as it is moved by the user and brought closer to a machine-readable link. In one example, the computing system may determine whether it is under such a state of motion. During the time the computing system is in motion, the one or more processes for resolving the machine-readable link, activated by the user may be put in a suspended state. It should be noted that during the suspended state, the execution of the applications may be ceased or put on hold.

Proceeding further, the computing system may continue to monitor whether it is in a state of motion or whether it is decelerating (i.e., as the computing system is brought closer to the machine-readable link). On determining that deceleration of the computing system has decreased less than a predefined value, the computing system may terminate the suspended state of the one or more applications. For example, as the user brings the computing system close to a machine-readable link the computing system would decelerate, and would ultimately be held still as the user attempts focusing the image capturing device onto the machine-readable link. As the deceleration falls below the predefined value, the computing system may reactivate the suspended link detection processes. It should be noted that as a result of temporarily suspending the link detection processes for the duration that the computing system is in motion may reduce overall computational overhead on the computing system, and also reduces the power consumed for running such processes on the computing system. In one example, one or more application once reactivated may be maintained in a reactivated state for a predefined interval of time.

In another example, the computing system may proceed and scan an image of the machine-readable link. Once scanned the computing system may further process the captured image to determine a patterned representation. Examples of patterned representations include, but are not limited to, a color histogram. Thereafter, attributes of the patterned representation may be determined. Based on the patterned representation, the computing system may further determine whether the machine-readable link is an image-based digital watermark. On determining that the machine-readable link under consideration is an image-based digital watermark, the computing system may initiate coding-decoding engines (codecs) corresponding to the image-based digital watermark for resolving. As would be understood, the present approaches allow for initiating the codecs on determining that the type of machine-readable link is image-based digital watermark. As a result, activating all coding-decoding engines for identification of other different types of machine-readable link may be avoided thereby reducing the computational load on the computing system.

As also noted previously, for resolving the machine-readable link so as to access the associated payoff, the image capturing device of the computing system may scan and capture an image of a machine-readable link. The captured image of the machine-readable link may be transmitted to a linking service system for processing and resolving the machine-readable link. Resolving any machine-readable link may be understood as returning or providing content-specific information linked with the machine-readable link to a user, when such link is interacted with or captured. A payoff may be considered as any information which is obtained upon capturing an image of a machine-readable link and fetching information linked to, or embedded within, such a machine-readable link. While scanning, the computing system may capture multiple image frames of the machine-readable link for improving accuracy of detection of the machine-readable link. In the present example, for an image frame under consideration, the computing system may process the image frame to obtain a corresponding key value. The image frame may be uploaded for further processing and for resolving the payoff. Thereafter, the subsequent image frame may also be processed for determining their respective key values.

The key values of the subsequent image frames are then compared with the key value of the previous image frame as a reference key value. In one example, the key value may be a hash value of the previous image frame and the subsequent image frames. Based on the comparison, it may be determined whether the subsequent and the previous image frames are similar or are different. For example, if the deviation between the key value and the reference key value is greater than a predefined threshold, the computing system may determine the subsequent image frame to be different from the previous uploaded image frame. The computing system may thereafter attempt to upload the subsequent image frame for resolving of payoff. Similarly, if the deviation is less than the predefined threshold, the subsequent image frame may be ascertained as similar to the previous image frame and hence, may not be uploaded for further processing. In this manner, since the subsequent image frames are in fact similar to image frames which had been previously uploaded, the subsequent image may not be uploaded thereby saving bandwidth.

Figure 1:
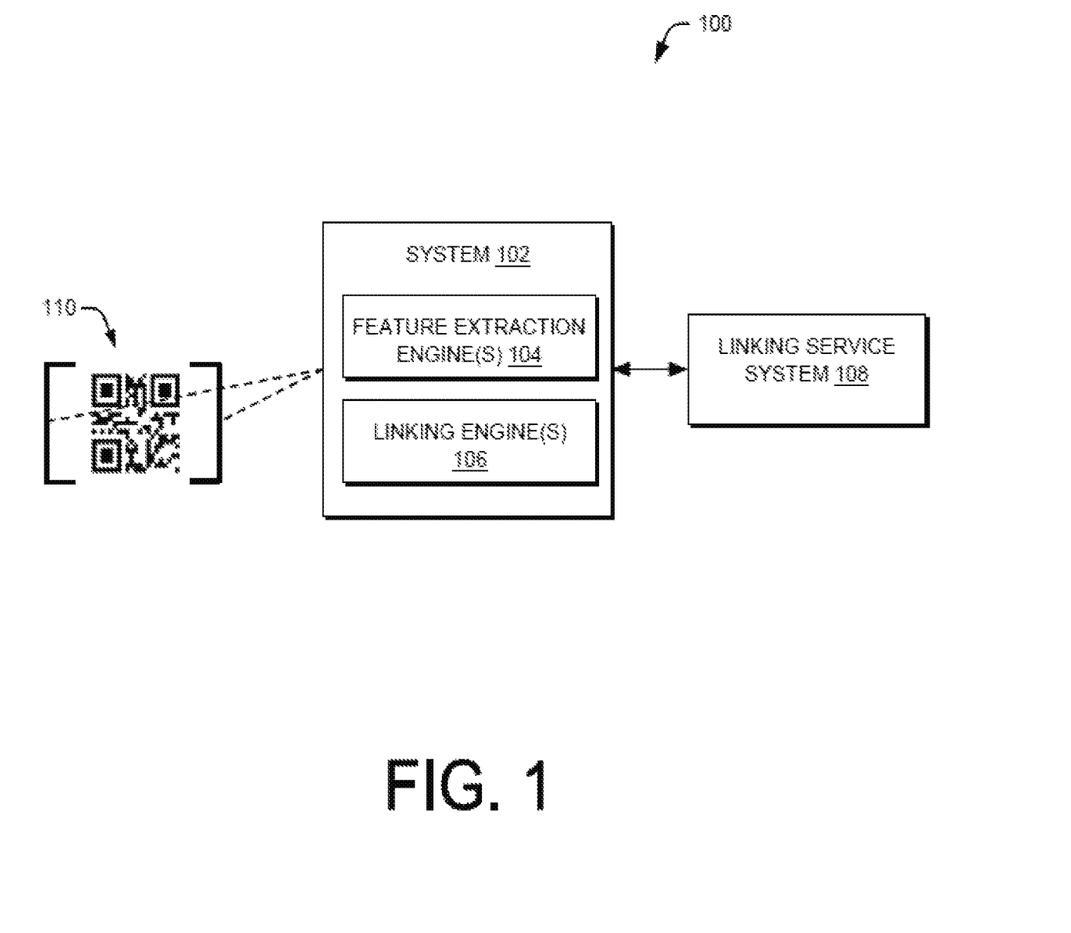
FIG. 1 is a block diagram of an example system for processing a machine-readable link.

These and other aspects are described in conjunction with one or more computing based devices as illustrated in FIGS. 1-7. FIG. 1 illustrates an example system 102 to process a machine-readable link. In the present example, the system 102 includes feature extraction engine(s) 104 and linking engine(s) 106. The system 102 may be implemented as a computing device. The system 102 may be in further communication with a remotely implemented linking service system 108. In operation, the system 102 may be used for scanning and resolving one or more machine-readable links, such as the machine-readable link 110. It should be noted that resolving the machine-readable link 110 may involve decoding the information associated with machine-readable link 110 and providing such information to a user of the system 102. The resolving of the machine-readable link, such as the link 110, may be implemented at the system 102, or at the linking service system 108. Resolving any machine-readable link may be understood as returning or providing content-specific information linked with the machine-readable link to a user, when such link is interacted with or captured. A payoff may be considered as any information which is obtained upon capturing an image of machine-readable link and fetching information linked to, or embedded within, such a machine-readable link. To this end, any user may position the system 102 such that the machine-readable link 110 may be scanned. As the user attempts to focus on the machine-readable link 110, the system 102 may intermittently capture one or more image frames.

For resolving, the system 102 may transmit image frames to the linking service system 108, where the image frames may be processed and the machine-readable link 110 may be resolved. Generally, in order to increase the accuracy with which the machine-readable links may be resolved, the system 102 may capture multiple image frames of the machine-readable link. Such multiple image frames may be slightly different from each other in terms of the perspective captured, angle at which the image was captured, sharpness, etc.

For any image frames, the feature extraction engine(s) 104 of the system 102 may initially extract one or more set of features. The set of features may be considered as any visual feature depicted in the captured image frame and forming a point of interest. Once the set of features are extracted, the feature extraction engine(s) 104 may further determine a key value corresponding to the set of features. In one example, the key value may be a hash value obtained for the set of features extracted by the feature extraction engine(s) 104.

On obtaining the key value corresponding to the image frame under consideration, the linking engine(s) 106 may obtain one or more reference key values of other image frames which may have been previously uploaded. The reference value of the image frame under consideration may then be compared with the reference key values, i.e., of image frames which may have been previously uploaded to the linking service system 108. Based on the comparison, the linking engine(s) 106 may determine whether the image frame under consideration has to be uploaded, or not, onto the linking service system 108. For example, if the key values differ by a margin greater than a predefined threshold, the linking engine(s) 106 may accordingly conclude that the image frame under consideration is not similar to image frames which may have been previously uploaded onto to the linking service system 108. It should be noted that as per the present example, such image frames which have not been previously uploaded would be further transmitted to the linking service system 108 for processing and resolving. In this manner, certain, but not all, image frames may be identified and uploaded onto the linking service system 108, thereby conserving network bandwidth. Once uploaded, the linking service system 108 may process the image frames for identifying and resolving the machine-readable link (such as machine-readable link 110) included therein for resolving.

Figure 2:
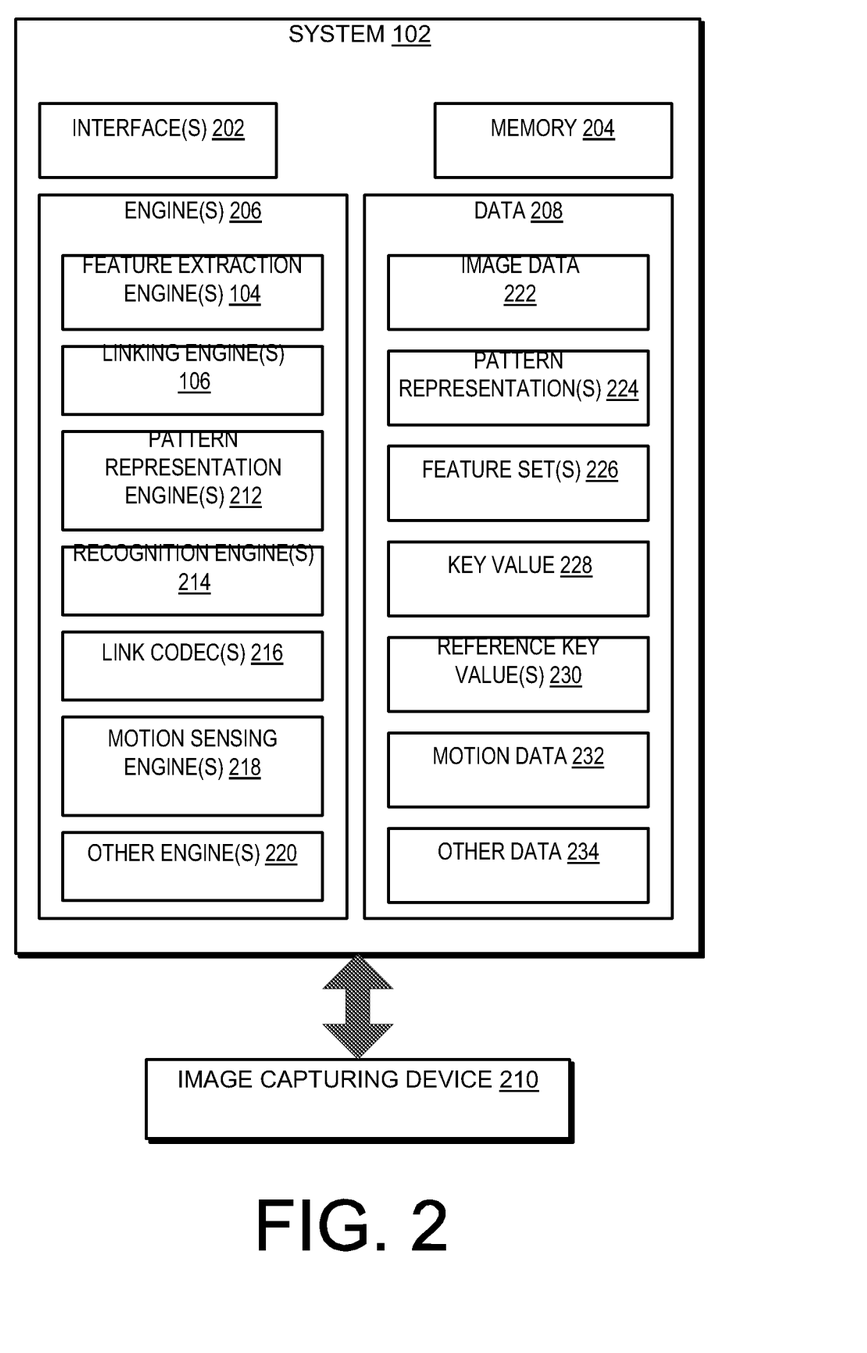
FIG. 2 is another block diagram of an example system for processing a machine-readable link.

These and other functionalities are provided in further detail in conjunction with FIG. 2. FIG. 2 illustrates an example system 102 to detect and process a machine-readable link. The system 102 may be implemented as a standalone computing system communicatively connected through a network to other devices, such as the linking service system 108. In another example, the system 102 may also be implemented onto the handheld computing devices, such as smartphones or tablets. In the present example, the system 102 includes interface(s) 202 and memory 204. The interface(s) 202 may include a variety of interfaces, for example, interfaces for data input and output devices, referred to as I/O devices, storage devices, network devices, and the like. The interface(s) 202 facilitate communication between the system 102 and various computing devices connected in a networked environment.

The memory 204 may store one or more computer-readable instructions, which may be fetched and executed so as to cause to provide access to digital content using a machine-readable link. The memory 204 may include any non-transitory computer-readable medium including, for example, volatile memory such as RAM, or non-volatile memory such as EPROM, flash memory, and the like.

The system 102 may further include engine(s) 206 and data 208. Besides engine(s) 206 and data 208, the system 102 may be further coupled to an image capturing device 210. The image capturing device 210 may be coupled to the system 102 through a wired or wireless medium. For example, the image capturing device 210 may be a web-based camera (or a webcam) which may be connected to the system 102. In another example, the image capturing device 210 may be integrated or embedded within the electronic circuitry of the system 102. For example, the system 102 may be smartphone with a built-in camera.

The engine(s) 206 may be implemented as a combination of hardware and programming (for example, programmable instructions) to implement one or more functionalities of the engine(s) 206. In examples described herein, such combinations of hardware and programming may be implemented in a number of different ways. For example, the programming for the engine(s) 206 may be processor executable instructions stored on a non-transitory machine-readable storage medium and the hardware for the engine(s) 206 may include a processing resource (for example, one or more processors), to execute such instructions. In the present examples, the machine-readable storage medium may store instructions that, when executed by the processing resource, implement engine(s) 206. In such examples, the system 102 may include the machine-readable storage medium storing the instructions and the processing resource to execute the instructions, or the machine-readable storage medium may be separate but accessible to system 102 and the processing resource. In other examples, engine(s) 206 may be implemented by electronic circuitry.

The data 208 includes data that is either predefined or generated as a result of the functionalities implemented by any of the engine(s) 206. In an example, the engine(s) 206 include the feature extraction engine(s) 104, linking engine(s) 106, pattern representation engine(s) 212, recognition engine(s) 214, link codec(s) 216, motion sensing engine(s) 218, and other engine(s) 220. The other engine(s) 220 may implement functionalities that supplement applications or functions performed by the system 102. Further, the data 208 may include image data 222, pattern representation(s) 224, feature set(s) 226, key value 228, reference key value 230, motion data 232 and other data 234.

In operation, the system 102 may implement plurality of functions using any one or more of the engine(s) 206. In one example, as discussed previously, machine-readable links provide a mechanism in which content, associated with the machine-readable link, may be obtained and presented to a user. In order to obtain such associated content, a user may initially position the system 102 so as scan a machine-readable link, such as the machine-readable link 110. Scanning a machine-readable link 110 may involve focusing the image capturing device 210 of the system 102 onto an area which carries the machine-readable link 110. While focusing the image capturing device 210, the system may obtain one or more image frames of the surface area being scanned including the machine-readable link 110. In another example, instead of capturing a plurality of image frames, the image capturing device 210 may also record a short video clip. Thereafter, the system 102 may process the video clip to obtain one or more image frames.

For attaining improved accuracy with respect to resolving the machine-readable link 110, the system 102 may transmit multiple image frames to a remotely implemented linking service, such as the linking service system 108 (shown in FIG. 1). Such image frames may slightly differ in certain characteristics such as the angle at which the image was captured, sharpness, etc. On capturing the image frames, the feature extraction engine(s) 104 extracts one or more set of features. The set of features may be considered as any visual feature depicted in the captured image frame, so as to form a point of interest. For example, the features may include edges of a QR code, the vertices, or any other indications which may be provided in the captured image. In another example, if the machine-readable link 110 is a watermark in the form of an image of a geographical structure, the features may include the contours of such geographical structure. The sets of features may be stored in the system 102 as feature set(s) 226.

On obtaining the feature set(s) 226, the feature extraction engine(s) 104 may further determine a key value, stored as key value 228, corresponding to the set of features. In one example, the key value may be a hash value obtained for the set of features extracted by the feature extraction engine(s) 104. In another example, the key value 228 may also be a checksum value.

It may be the case that for resolving the machine-readable link 110, one or more image frames may have been uploaded previously. Returning to the present mechanism, once the key value 228 is obtained for the image frame under consideration, the linking engine(s) 106 may further obtain one or more reference key values of other image frames which may have been previously uploaded. The linking engine(s) 106 may compare the key value 228 with the reference key values (stored as reference key value 230) of image frames which may have been previously transmitted to the linking service system 108.

Based on the comparison of the values 228, 230, the linking engine(s) 106 may determine whether image frames similar to the image frame consideration has been previously transmitted or not, onto the linking service system 108. For example, if the difference between the key value 228 and the reference key value 230 is less than a predefined threshold, the linking engine(s) 106 may accordingly conclude that the image frame under consideration is similar to a previously uploaded image frame. In such a case, the image frame under consideration may not be uploaded onto the linking service system 108, and may be discarded. Conversely, if the difference between the key value 228 and the reference key value 230 is greater than the predefined threshold, the linking engine(s) 106 may conclude that the image frame under consideration is not similar to any other image frames which may have previously uploaded. Thereafter, such an image frame may then be uploaded onto the linking service system 108.

In another example, as opposed to being resolved by a remotely enabled linking service system 108, the machine-readable links, such as the machine-readable link 110 may also be resolved by the system 102. Furthermore, amongst different type of machine-readable links which are available, image-based digital watermarks may be considered as appealing when considered with respect to other types of machine-readable link such as bar codes or QR codes. For example, image-based digital watermarks when used may be overlaid onto any content. When overlaid, such image-based digital watermarks may be such that they may be indiscernible to the human eye. In certain cases, certain data or information may be associated with the image itself, wherein the image itself would function as a machine-readable link.

In the present example, a user intending to resolve a machine-readable link 110 may use the image capturing device 210 for capturing an image of the machine-readable link 110. The captured image may include either a portion or may include the complete machine-readable link 110. The captured image may be stored in image data 222. Once the image is captured, the pattern representation engine(s) 212 may further process the captured image to provide a pattern representation(s) 224. In one example, the pattern representation(s) 224 may include a color histogram. As would be understood, a color histogram provides a representation of the distribution of colors in an image. In some cases, the color histogram may be used to depict the distribution of primary color, such as red, blue or green hues in an image. Although the present example is explained in conjunction with a color histogram, other forms of representations, are also included within the scope of the present subject matter.

Once the pattern representation(s) 224 is obtained, the recognition engine(s) 214 processes the pattern representation(s) 224 to determine the type of the machine-readable link 110. In one example, the recognition engine(s) 214 may further determine an attribute corresponding to the pattern representation(s) 224. An example of the attribute may include a color entropy factor where the pattern representation(s) 224 is a color histogram. The attribute may be considered as providing a quantitative value depicting the distribution of colors in an image. The distribution of colors in any image would be indicative of the fact that the machine-readable link 110 is an image-based digital watermark. In the present example, based on the distribution of the different colors, the recognition engine(s) 214 may determine that the machine-readable link 110 is an image-based digital watermark. In one example, the recognition engine(s) 214 may compare the color entropy values of the captured image with the prestored values. Based on the comparison, the recognition engine(s) 214 may conclude whether the machine-readable link 110 under consideration is an image-based digital watermark. For example, color entropy values corresponding to a image-based digital watermark would show more gradual variances between different colors, whereas for bar codes and QR codes, the variations in color would be more defined Once the machine-readable link 110 is identified as image-based digital watermark, the recognition engine(s) 214 may further initiate one or more link codec(s) 216 for decoding and resolving the image-based digital watermark. The present approaches allow for the identification and detection of image-based digital watermarks, and also allow for activating link codec(s) 216 which correspond to decoding of image-based digital watermark. The link codec(s) 216 may subsequently decode the image-based digital watermark and obtain the corresponding content accordingly. In such a manner, executing or activating all link codec(s) 216 may be avoided, thereby reducing the computational over head onto the system 102.

In certain circumstances, a user intending to resolve a machine-readable link, such as link 110, may initially activate one or more link codec(s) 216 on the system 102. Furthermore, the image capturing device 210 of the system 102 may also have to activated before the system 102 may be used for scanning and resolving the machine-readable link 110. Once activated, the user may subsequently move the system 102 from an initial position to a position which lies in close proximity to the machine-readable link 110. As mentioned previously, maintaining the link codec(s) 216 and the image capturing device 210 in an active state during a time interval when such applications and functions are not being used, would unnecessarily impose a strain on the battery backup of the system 102.

In one example, the linking engine(s) 106 may determine whether one or more applications or functions, which are to be utilized for resolving a machine-readable link 110 are active or not. Such applications or functions may be activated by the user. Examples of such applications include, but are not limited to, retail related mobile applications which may be installed on a smartphone. Functions may include a camera function, which may be activated by activating the image capturing device 210 associated with the system 102.

Once the aforesaid applications and the functions are activated, the motion sensing engine(s) 218 may further determine whether the system 102 is in motion or not. As discussed previously, the system 102 may be brought about in motion when a user intending to scan a machine-readable link 110, brings the system 102 from its initial position to a position which is proximal to the machine-readable link 110. In one example, the motion sensing engine(s) 218 may be implemented using electronic elements such as accelerometers, gyroscopes, etc. Other mechanisms for sensing motion of the system 102 may also be considered without deviating from the scope of the present subject matter.

The motion of the system 102 would involve a brief period of acceleration followed by deceleration as the system 102 is brought closer to the machine-readable link 110. In the present example, the motion sensing engine(s) 218 may determine the value of acceleration the system 102 experiences. In one example, the deceleration may be determined along multiple orthogonal axes. On the acceleration value exceeding a threshold value, the linking engine(s) 106 may suspend the execution of the aforesaid applications and functions such that they are in an inactive state. During the inactive state, the applications and functions for resolving machine-readable link 110 may be considered as consuming minimal to nil computing resources.

The motion sensing engine(s) 218 may continue to monitor the acceleration while the system 102 is in a state of motion. As explained previously, as the system 102 is brought closer to the machine-readable link 110, the system 102 would decelerate and may ultimately come to a substantially stationary position. The stationary position may occur when the user attempts to hold the system 102 steady and focus on the machine-readable link 110. While attaining the steady position, the system 102 would undergo a deceleration, the value of which is continuously monitored by the motion sensing engine(s) 218. Once the deceleration drops below a predefined value, the linking engine(s) 106 may further reactivate the applications and functions which had been put in an inactive state. The linking engine(s) 106 may further continue to maintain the applications and functions in an active state till the acceleration value does not exceed the predefined value. In another example, the linking engine(s) 106 may continue to maintain the applications and functions in an active state for a predetermined interval of time.

FIGS. 3-6 illustrate example methods 300, 400, 500, and 600, respectively, to process a machine-readable link, according to an implementation of the present subject matter. The order in which the methods are described is not intended to be construed as a limitation, and any number of the described method blocks may be combined in any order to implement the aforementioned methods, or an alternative method. Furthermore, methods 300, 400, 500, and 600 may be implemented by processing resource or computing device(s) through any suitable hardware, non-transitory machine readable instructions, or combination thereof.

It may also be understood that methods 300, 400, 500, and 600 may be performed by programmed computing devices, such as system 102 as depicted in FIGS. 1-2. Furthermore, the methods 300, 400, 500, and 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 300, 400, 500, and 600 are described below with reference to system 102 as described above; other suitable systems for the execution of these methods may also be utilized. Additionally, implementation of these methods is not limited to such examples.

Returning to FIG. 3, at block 302 a captured image of at least a portion of machine-readable link is obtained. The machine-readable link is readable by a computing system to obtain access to digital content using a communication network. In one example, the captured image may be obtained by the image capturing device 210 of the system 102. The captured image may be such that it may either include a portion or an entire machine-readable link, such as link 110.

Figure 3:
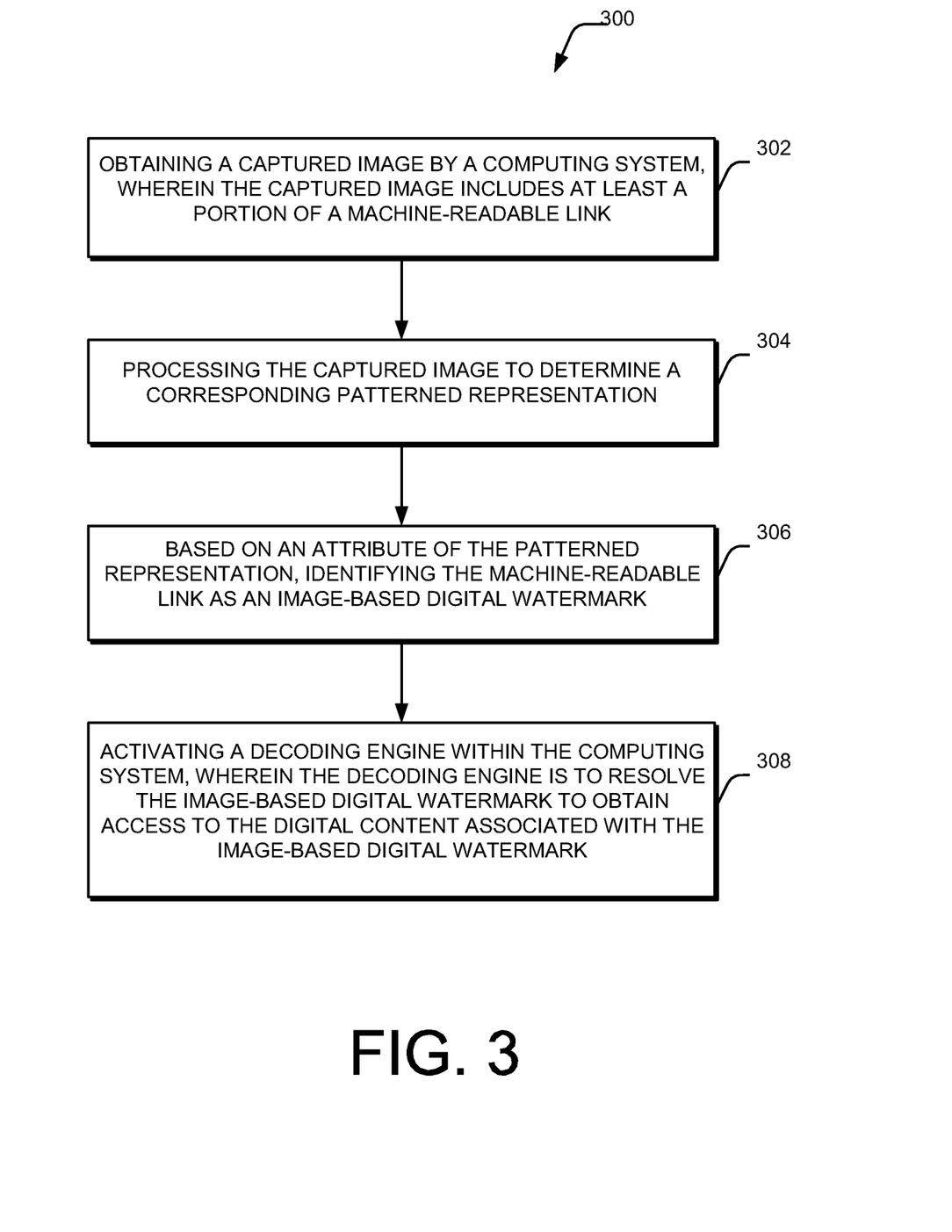
FIG. 3 is a flowchart of an example method for processing a machine-readable link.

At block 304, the captured image is process to determine a corresponding patterned representation. In one example, the pattern representation engine(s) 212 processes and analyzes the captured image to generate one or more pattern representation(s) 224. Examples of pattern representation(s) 224 include but are not limited to, a color histogram. As would be understood, such pattern representation(s) 224 indicate the extent of distribution of different colors within the captured image.

At block 306, depending on the patterned representation, it is further determined whether the machine-readable link is an image-based digital watermark. An image-based digital watermark may be any image or pattern which may be overlaying an area on which the image-based digital watermark is provided. The image-based digital watermark may also be such that it is indiscernible to the human eye but may be detected by a computing device, such as the system 102. In one example, the machine-readable link 110 is identified as an image-based digital watermark by the linking engine(s) 106. To this end, the recognition engine(s) 214 may further determine an attribute corresponding to the pattern representation(s) 224. An example of the attribute may include a color entropy factor where the pattern representation(s) 224 is a color histogram. The attribute may be considered as providing a quantitative value depicting the distribution of colors in an image. Based on the value of the attribute of the pattern representation(s) 224, the linking engine(s) 106 may determine the type of machine-readable link 110 as an image-based digital watermark.

At block 308, decoding engines for decoding the image-based digital watermark are activated. The decoding engines would be utilized for resolving the image-based digital watermark, and to obtain the content associated with the image-based digital watermark. In one example, the linking engine(s) 106 may further activate one or more link codec(s) 216 for resolving and decoding the image-based digital watermark.

Figure 4:
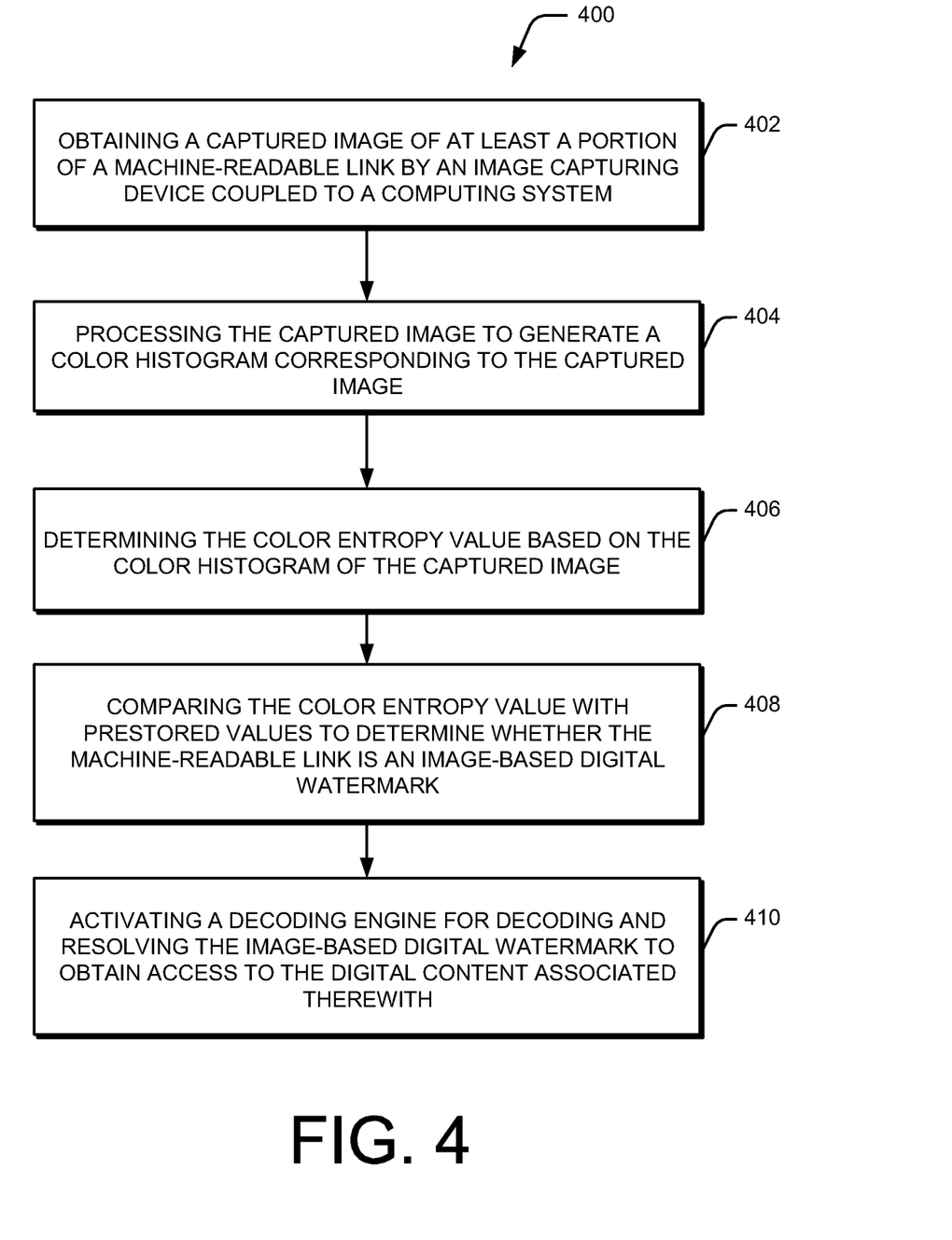
FIG. 4 is a flowchart of another example method for processing a machine-readable link.

FIG. 4 provides another example method 400 for processing a machine-readable link. At block 402, a captured image of at least a portion of a machine-readable link is obtained. In one example, the image of a machine-readable link 110 is captured by the image capturing device 210 of the system 102. As also discussed previously, the image capturing device 210 may be either coupled to or integrate within the electronic circuitry of the system 102.

At block 404, the captured image may be processed to generate a color histogram corresponding to the captured image. In one example, the pattern representation engine(s) 212 may process the captured image stored in image data 222, to generate a corresponding color histogram. The color histogram may indicate the distribution of the different colors, such as the primary colors, within the captured image.

At block 406, a color entropy value based on the color histogram is further determined. For example, the pattern representation engine(s) 212 may evaluate the color histogram as the pattern representation(s) 224. Once the color histogram is determined, the pattern representation engine(s) 212 may further determine attributes of the color histogram. In one example, the attributes include color entropy which may be stored in other data 234.

At block 408, the color entropy value for the corresponding captured image is compared with one or more prestored values. For example, the recognition engine(s) 214 may compare the color entropy values of the captured image with the prestored values. Based on the comparison, the recognition engine(s) 214 may conclude whether the machine-readable link 110 under consideration is an image-based digital watermark. For example, color entropy values corresponding to a image-based digital watermark would show more gradual variances between different colors, whereas for bar codes and QR codes, the variations in color would be more defined.

At block 410, one or more decoding engines for resolving the image-based digital watermark are activated. In one example, the recognition engine(s) 214 may further activate the one or more link codec(s) 216 for decoding and resolving the image-based digital watermark. On resolving the image-based digital watermark, the content which is associated therein is obtained, say from a central repository, and provided to a user who may have interacted with the machine-readable link 110.

Figure 5:
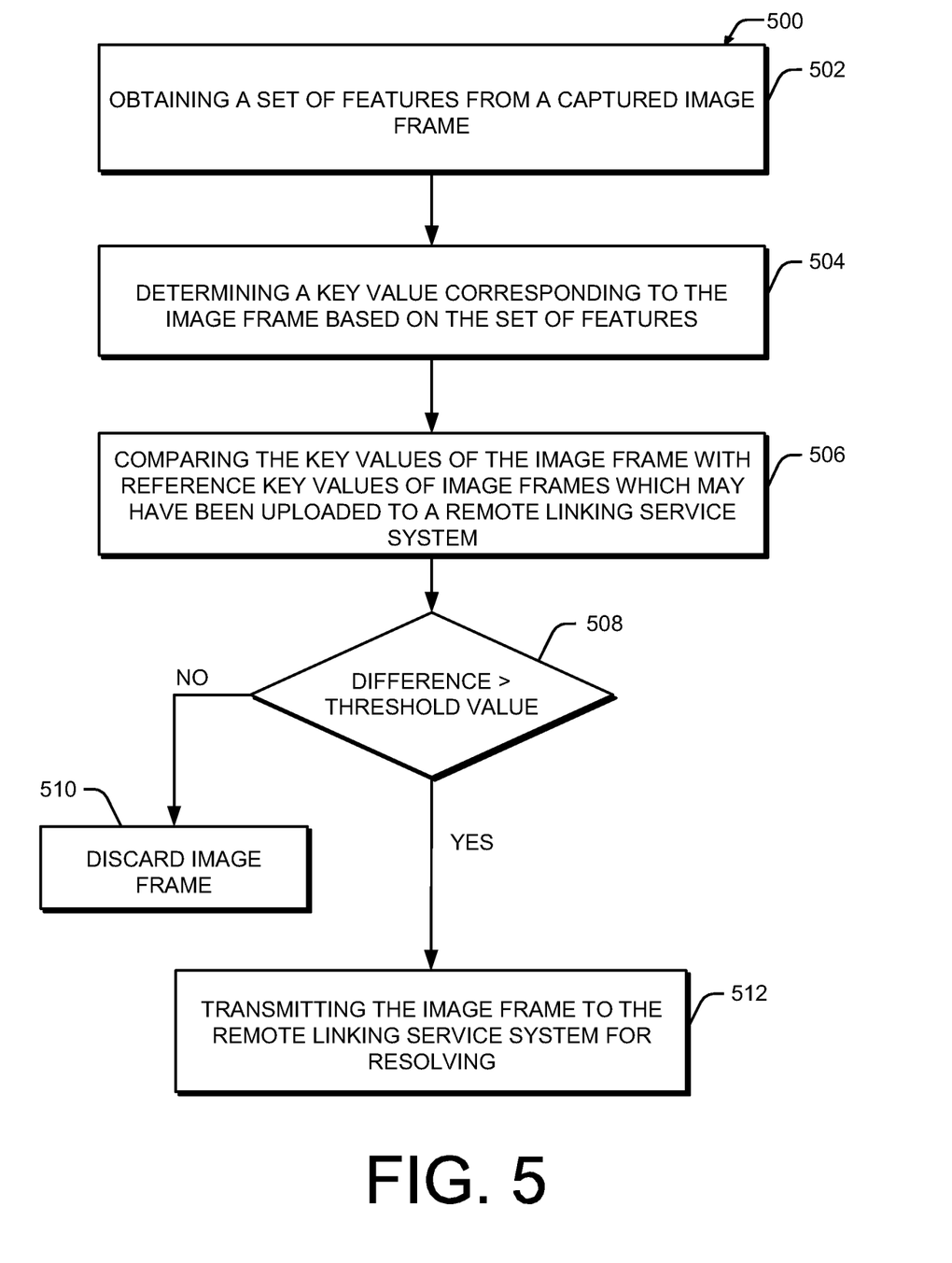
FIG. 5 is a flowchart of yet another example method for processing a machine-readable link.

Besides the above processes, the system 102 may implement other methods, such as methods 500 and 600 for detection of a machine-readable link. These methods may be implemented by any of the systems as depicted in FIG. 1-2. Continuing with the present subject matter, as depicted in FIG. 5, at block 502, a set of features are determined for a captured image. The captured image is such that it includes either a portion, or a complete machine-readable link. In one example, the image capturing device 210 coupled with the system 102 may capture an image of the machine-readable link 110 and store the same in image data 222. The images of the machine-readable link 110 are captured for being uploaded to a central linking service, such as linking service system 108 for resolving their respective associated content. The feature extraction engine(s) 104 extracts one or more set of features. The set of features may be considered as any visual feature depicted in the captured image frame forming a point of interest. The sets of features may be stored in the system 102 as feature set(s) 226.

At block 504, a key value corresponding to the image frame, and based on the set of features, is determined. For example, the feature extraction engine(s) 104 may further determine a key value, stored as key value 228, corresponding to the set of features. In one example, the key value may be a hash value obtained for the set of features extracted by the feature extraction engine(s) 104. In another example, the key value 228 may also be a checksum value.

At block 506, key value of the captured image frame is compared with the reference key values of image frames which may have been uploaded to the central linking service. In one example, the linking engine(s) 106 may compare the key value 228 with the reference key values 230 of image frames which may have been previously transmitted to the linking service system 108.

At block 508, a determination is made to ascertain whether the difference between the key value of the captured image fame and the reference key values exceed a threshold value. For example, if the linking engine(s) 106 determines that the difference between the key value 228 and the reference key value 230 does not exceed the threshold value ('No' path from block 508), the linking engine(s) 106 may conclude that a similar image perhaps has been previously uploaded, and proceed to discard the image frame. On other hand, if the linking engine(s) 106 determines that the difference between the reference key value 230 and the key value 228 is greater than the threshold value ('Yes' path from block 508), the linking engine(s) 106 may proceed and transmit the image frame under consideration to a central linking service, such as the linking service system 108 (block 512). The linking service system 108 may further process the one or more captured images for resolving the machine-readable link 110.

Figure 6:
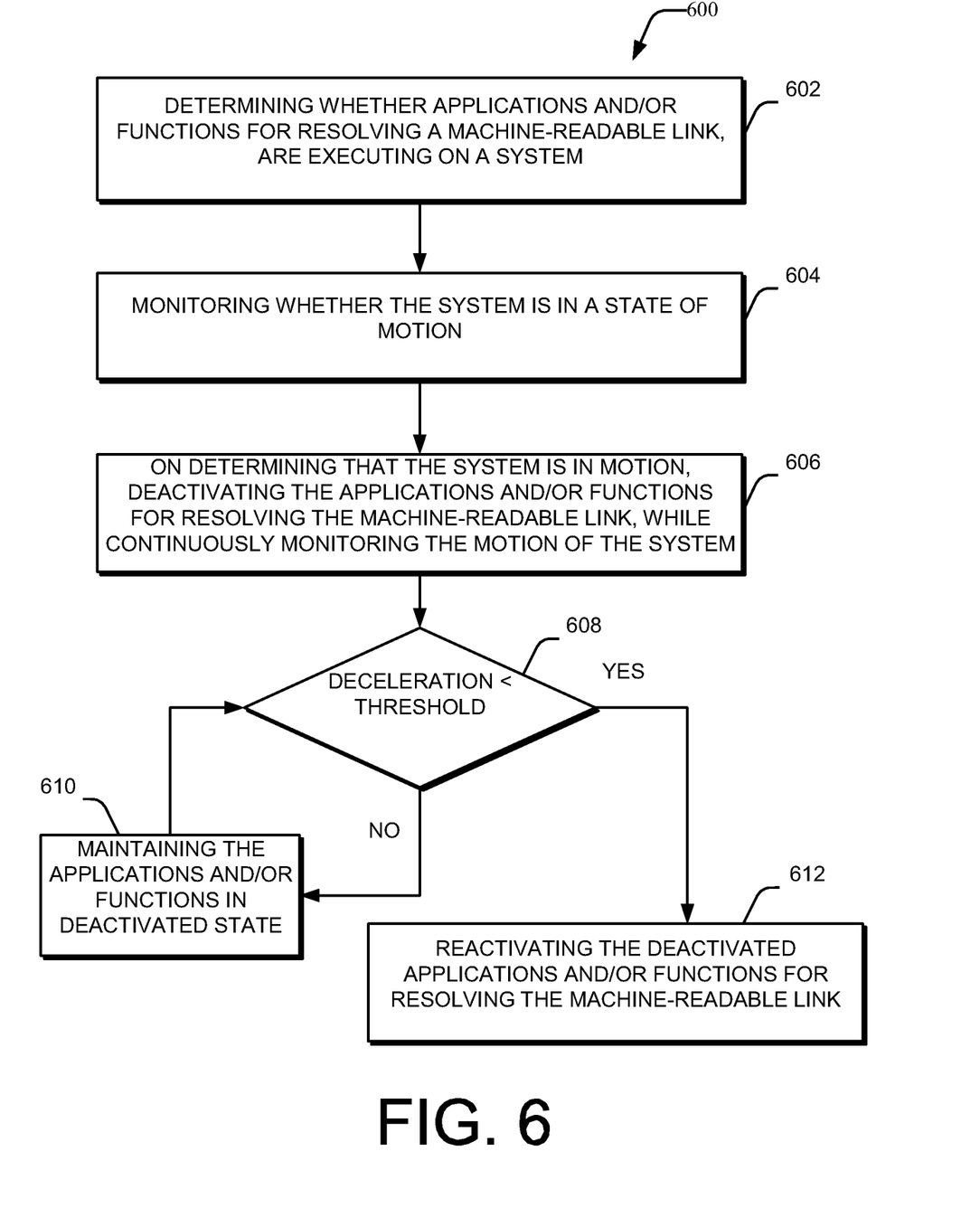
FIG. 6 is a flowchart of an example method for processing a machine-readable link.

FIG. 6 provides another example method for detection of machine-readable link. At block 602, it may be determined whether one or more applications or functions, which would be required for resolving machine-readable links, are executing or active on a computing system. For example, a user intending to scan a machine-readable link 110 may initiate one or more applications installed on the system 102 (e.g., a smartphone). In one example, such applications may include one or more link codec(s) 216. Once initiated, the linking engine(s) 106 may determine whether such applications are in an active state of execution or not.

At block 604, the system may be monitored to determine whether it is in a state of motion. In one example, the motion sensing engine(s) 218 may detect whether the system 102 is in a state of motion or not. The motion sensing engine(s) 218 may be implemented using electronic devices such as an accelerometer, a gyroscope, etc. It should be noted that the system 102 would be in motion when the user intending to scan a machine-readable link 110, brings the system 102 from its initial position to a position which is proximal to the machine-readable link 110.

At block 606, on determining whether the system is in motion, the applications and functions for resolving the machine-readable link are deactivated. For example, based on the determination made by the motion sensing engine(s) 218, the linking engine(s) 106 may deactivate the applications and the functions intended for resolving the machine-readable link 110. As would be understood, when deactivated such applications and functions would utilize minimal or nil computational resources of the system 102.

At block 608, depending on the instantaneous deceleration of the system a determination is made to ascertain whether the deceleration is less than a threshold. The deceleration may be measured and determined by the motion sensing engine(s) 218. It would be understood that as the user brings the system 102 close to the machine-readable link 110, the system 102 would experience a deceleration, and would come to a substantially stationary position. The linking engine(s) 106 may subsequently compare the instantaneous deceleration with the threshold value.

Depending on the comparison, the course of action for the applications and the functions would be determined. For example, if it is determined that the value of the deceleration is greater than the threshold ('No' path from block 608), the linking engine(s) 106 would maintain the applications and the functions in the deactivated state (block 610). At this stage, the process flow would go back to block 608 for determining whether the value of the deceleration has altered with respect to the threshold.

If however, the linking engine(s) 106 determines that the deceleration is less than the threshold ('Yes' path from block 608), the linking engine(s) 106 may further reactivate the applications and the functions for resolving the machine-readable link 110 (block 612). In one example, the linking engine(s) 106 may maintain the applications and the functions in an active state till the value of its acceleration stays within the threshold or for a predefined time interval. Accordingly, when the applications and the functions are activated, the machine-readable link 110 may be scanned and resolved.

Figure 7:
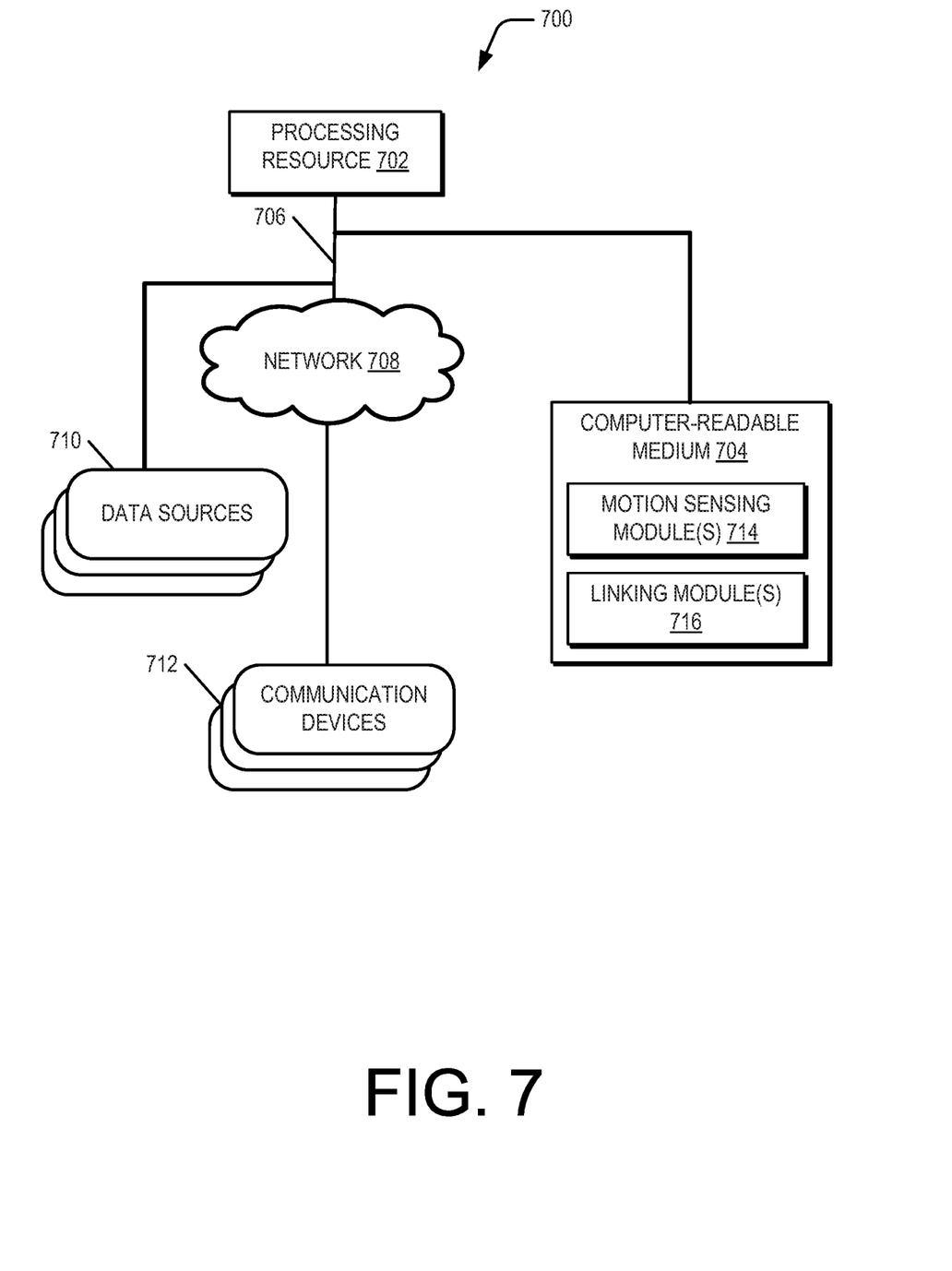
FIG. 7 is a block diagram of an example system implementing a non-transitory computer-readable medium, to process a machine-readable link.

FIG. 7 illustrates a system environment 700 to process a machine-readable link, according to an example of the present disclosure. The system environment 700 may comprise at least a portion of a public networking environment or a private networking environment, or a combination thereof. In one implementation, the system environment 700 includes a processing resource 702 communicatively coupled to a computer readable medium 704 through a communication link 706.

For example, the processing resource 702 can include one or more processors of a computing device to process a machine-readable link. The computer readable medium 704 may be, for example, an internal memory device of the computing device or an external memory device. In one implementation, the communication link 706 may be a direct communication link, such as any memory read/write interface. In another implementation, the communication link 706 may be an indirect communication link, such as a network interface. In such a case, the processing resource 702 can access the computer readable medium 704 through a network 708. The network 708 may be a single network or a combination of multiple networks and may use a variety of different communication protocols.

The processing resource 702 and the computer readable medium 704 may also be coupled to data sources 710 through the communication link 706, and/or to communication devices 712 over the network 708. The coupling with the data sources 710 enables in receiving the data in an offline environment, and the coupling with the communication devices 712 enables in receiving the data in an online environment.

In one implementation, the computer readable medium 704 includes a set of computer readable instructions, implementing a motion sensing module(s) 714 and a linking module(s) 716. The motion sensing module(s) 714 may, in one example, be executable code for ascertaining motion and orientation of a system 102, based on the detections made by, say an accelerometer. The set of computer readable instructions within medium 704 may be accessed by the processing resource 702 through the communication link 706 and subsequently executed to process data communicated with the data sources 710 in order to process a machine-readable link.

In one example, linking module(s) 716 may determine whether one or more applications or functions, which are to be utilized for resolving a machine-readable link 110 are active or not. Such applications or functions may be activated by the user. Examples of such applications include, but are not limited to, retail related mobile applications which may be installed on a smartphone. Once the aforesaid applications and the functions are activated by the linking module(s) 716, the motion sensing module(s) 714 may further determine whether the system 102 is in motion or not.

In the present example, the motion sensing module(s) 714 may determine the value of acceleration the system 102 experiences. In one example, the deceleration may be determined along multiple orthogonal axes. On the acceleration value exceeding a threshold value, linking module(s) 716 may suspend the execution of the aforesaid applications and functions such that they are in an inactive state. During the inactive state, the applications and functions for resolving machine-readable link, such as link 110 may be considered as consuming minimal to nil computing resources.

The motion sensing module(s) 714 may continue to monitor the acceleration while the system 102 is in a state of motion. As explained previously, as the system 102 is brought closer to the machine-readable link 110, the system 102 would decelerate and may ultimately come to a substantially stationary position. Once the deceleration drops below a predefined value, linking module(s) 716 may further reactivate the applications and functions which had been put in an inactive state. The linking module(s) 716 may further continue to maintain the applications and functions in an active state till the acceleration value does not exceed the predefined value.

Although examples for the present disclosure have been described in language specific to structural features and/or methods, it should stood that the appended claims are not necessarily limited to the specific features or methods described. Rather, the specific features and methods are disclosed and explained as examples of the present disclosure.

We claim:

1. A non-transitory computer-readable medium comprising instructions executable by a processing resource to:
   detect whether at least one application for resolving any machine-readable link is in an active state of execution on a computing system;
   suspend the active state of execution of the at least, one application on determining the computing system to be in motion, wherein the motion is brought about by a user moving the computing system to a machine-readable link;
   determine deceleration in the motion of the computing system; and
   on determining the deceleration to be less than a predefined threshold, reactivate the execution of the at least one application.

2. The computer-readable medium as claimed in claim 1, wherein the machine-readable link is one of a barcode, a digital watermark, a Quick Response (QR) code and an optically readable image.

3. The computer-readable medium as claimed in claim 1, wherein the instructions are to further maintain the execution of the at least one application in the active state after reactivating for a predefined interval of time.

4. The computer-readable medium as claimed in claim 1, wherein the instructions are to further maintain the execution of the at least one application in the active state after reactivating until an acceleration of the motion of the computing system does not exceed a predefined value.

5. The computer-readable medium as claimed in claim 1, wherein the deceleration is determined along multiple orthogonal axes.

6. A method comprising:
   detecting whether at least one application for resolving any machine-readable link is in an active state of execution on a computing system;
   suspending the active state of execution of the at least one application on determining the computing system to be in motion, wherein the motion is brought about by a user moving the computing system to a machine-readable link;
   determining deceleration in the motion of the computing system; and
   on determining the deceleration to be less than a predefined threshold, reactivating the execution of the at least one application.

7. The method of claim 6, wherein the machine-readable link is one of a barcode, a digital watermark, a Quick Response (QR) code and an optically readable image.

8. The method of claim 6, further comprising maintaining the execution of the at least one application in the active state after reactivating for a predefined interval of time.

9. The method of claim 6, further comprising maintaining the execution of the at least one application in the active state after reactivating until an acceleration of the motion of the computing system does not exceed a predefined value.

10. The method of claim 6, wherein the deceleration is determined along multiple orthogonal axes.

* * * * *